Sept. 20, 1971   R. I WEINER ET AL   3,606,207
REENTRY VEHICLE FOR THERMOELECTRIC GENERATOR
Filed March 8, 1968   9 Sheets-Sheet 2

United States Patent Office 3,606,207
Patented Sept. 20, 1971

3,606,207
REENTRY VEHICLE FOR THERMOELECTRIC GENERATOR
Robert I. Weiner, Pikesville, Md., and Alvin H. Kasberg, Murrysville, and Carl Alvin Bodenschatz, Indiana, Pa., assignors to Nuclear Materials and Equipment Corporation, Apollo, Pa.
Filed Mar. 8, 1968, Ser. No. 711,619
Int. Cl. B64g 1/00
U.S. Cl. 244—1                10 Claims

ABSTRACT OF THE DISCLOSURE

A vehicle 21 of the unoriented type, particularly a radioactive isotope thermoelectric generator for use in space which is capable of intact reentry and survival in the earth's atmosphere. The vehicle is also capable of offering sufficient protection to radioactive capsules 53 or the like which it carries that these capsules are not buried, broken or melted down. The vehicle 21 has an outer casing or enclosure 23 from which fins 25, 27 (FIG. 1) extend, the fins predominately mutually support each other and do not rely on support by the casing 23. Specifically the casing is in the form of a sphere and the fins are in the form of a grid of orthogonal rings extending at right angles to the sphere.

BACKGROUND OF THE INVENTION

This invention relates to space vehicles, and predominately to vehicles including power generating apparatus, and has particular relationship to generators referred to in the art as Systems For Nuclear Auxiliary Power (SNAP) which are used in space vehicles, ICBM's and the like. The vehicles may also include other than power generation apparatus, for example instruments or even personnel. In the interest of concreteness, the discussion in this application will be confined largely to SNAP-RTG apparatus.

SNAP generators produce electrical power and typically have a capacity of several hundred watts (310 watts). These generators include a primary source of energy, typically a fuel such as a radioactive isotope, for example, Pu 238, and a converter, typically of the thermoelectric type, for converting the primary energy into electrical energy. Generators including radioactive fuel and thermoelectric converters are referred to in the art as radioisotope thermoelectric generators (RTG) and the power systems are usually designated SNAP-RTG. The primary source may be a nuclear reactor where power of greater magnitude is required.

It is essential that a generator for use in space shall avail a maximum of power while weight is minimized; that is, the specific power, the watts per pound, should be maximized. Specifically the specific power should be about several watts per pound of generator. In addition it is necessary that the fuel or energy source of the generator shall not produce a dangerous radioactive condition in the eventuality of orbital or super-orbital abort. It is an object of this invention to provide a generator meeting these conditions.

This invention concerns itself primarily with the achievement of the above object by appropriately forming the outer configuration of the generator and it is an object of this invention to provide a generator or vehicle which shall meet the following conditions:

(1) It shall survive in its earth's orbital reentry environment.
(2) Fuel capsules or the like in the generator shall survive terminal velocity impact.
(3) Such capsules shall not bury themselves in the earth.
(4) The fuel capsule or fuel shall not melt-down under any conditions.
(5) The fuel shall not be released under any conditions.
(6) The specific power of the system shall be 2 watts/lb. or greater.
(7) The basic external configurations shall be applicable to all power levels, fuel forms and converters.
(8) It shall involve no unusual fabrication and materials problems.

In accordance with the teachings of the prior art generators with outer casing configurations both of the gravity-unoriented and of the gravity-oriented type have been provided. In evaluating the various casings and configurations the ballistic coefficient is relied upon. This coefficient is given by the equation $$B = \frac{W}{C_D A_P} \quad (1)$$

where:

B = ballistic coefficient
W = total weight of the generator
$C_D$ = average drag coefficient of the generator at hypersonic speeds
$A_P$ = total projected area of the generator The generators of unoriented outer configuration depend upon random spin and tumble during the re-entry to lower the average heating of the generator in its earth's orbit. There are three sub-classes of techniques in this prior art unoriented class.

(1) The generator shell or casing rejects or absorbs all heat and maintains its integrity up to impact. Typical of such prior art is a cylindrical casing with fins extending laterally from its surface.

(2) The generator shell and structure absorbs most re-entry energy and is destroyed. It is contemplated that the destruction may take place at an altitude where the fuel capsules survives the remaining heating. The fuel capsules are protected or unprotected, depending on release altitude, materials and impact requirements.

(3) The generator shell is destroyed early in the re-entry and the fuel capsule with or without protection, absorbs or rejects the remaining re-entry and impact energy.

In general, the unoriented generators have lower ballistic coefficients, B, and are exposed to lower stagnation heating and total heating than the oriented generators. This occurs because of the non-damping of the spin and tumble of the unoriented generator. The stagnation point wanders around the total surface area of the generator producing only a transient heat pulse at any point and allowing significant re-radiation and convective cooling of the point as it rotates into the wake of the flow field.

Practically speaking, in addition to the transient effects, the entire surface area of the generator rather than a portion of the area as in oriented generators is called on to absorb the same energy thereby lowering the average energy flux per unit area.

The difficulty with the class 1 unoriented structures is that, unless the enclosure has a high mass (is very thick) with a resulting low specific power, the enclosure becomes hot and softens during re-entry and the fins are bent towards the enclosure materially increasing the ballistic coefficient so that the generator or vehicle does not survive in the reentry orbit.

In the class 2 structures the destruction results in an increase in the ballistic coefficient and in an increased probability that the fuel capsules may not survive. Increase in the protective mass of the capsules results in decreased specific power. Low specific power because of increased capsule mass is also inherent in class 3 structures.

In the oriented generators the external configuration of the generator is such that in moving in an orbit into the earth it orients itself in a preferential manner during the re-entry. The re-entry heating then occurs in a predetermined area on the RTG's surface. With this area known in advance and assured, this area can be heavily protected from the heating by appropriate materials and the remainder of the generator in the low heating regions requires very little protection. The result ideally is a minimal weight increase to survive the re-entry.

The principal oriented configurations are:
(1) The flared-cone cylinder with lateral fins.
(2) The flared-cone cylinder without fins.
(3) The disc-shaped planetary lander.

Because of wide separation between its center of gravity and its center of pressure, which results in high aerodynamic damping moments to counteract random tumbling induced upon release from the parent vehicle, the flared-cone cylinder, whether finned or unfinned, is effectively damped early in its re-entry into the earth's atmosphere. But this configuration has a relatively high ballistic coefficient so that where the heaing is concentrated the heating rate is high and in addition the impact velocities are high. Provisions must also be made in the mounting of the energy source and converter for effective heat rejection under normal operating conditions. Material of high termal conductivity must then be used for the generator enclosure so that the heat generated can be radiated away. During re-entry this high thermal conductivity militates against survival unless heat is effectively stored and for this reason the enclosure must have a high heat capacity; that is, high specific heat and must be of thick material reducing the specific power of the generator. The enclosure can be coated with graphite for good radiation but in the finned configuration, the fins penetrate the graphite and would burn off unless their edges were capped with graphite. This presents the problem of reverse heat flow from the fins.

In practice generators of this flared-cone cylinder configuration having an output of between 100 and 300 watts have been found to have a specific power of only .9 to 1.25 watts per pound.

The disc-shaped planetary lander configurations, to achieve intact re-entry, capitalize on decreasing the ballistic coefficient of the generator thereby decreasing total and stagnation heating during re-entry. This decrease is anticipated because of the great increase in system drag during re-entry, yielding more deceleration at much higher altitudes than with the lower ballistic coefficient structures. Because of the exponential character of the change in density of the drag medium (air) with increasing altitude, maximum stagnation point heating rates are much lower. In addition, the high drag shortens the length of trajectory thereby reducing the magnitude and length of the heat pulse. Total heating is the mathematical integral of the average heat flux over the time of decent and is significantly reduced.

But, the key to success of these configurations is orientation rate. If a disc configuration enters the atmosphere tumbling, it must orient itself in a very short time or the rear face radiator surface burns through or transmits enough heat to the internal fuel capsule assembly to cause rupture or meltdown of the fuel capsules.

Since the inherent construction of the disc systems is such that the center of gravity and center pressure are near each other, the aerodynamic damping moments are low and stability with the disc back face radiator surface forward is possible. In addition, because of the shape of the disc, slight angles of attack could yield substantial lift to the trajectory even if proper orientation were achieved. This factor increases the time that the generator is exposed to the heat pulse and significantly affects the amount of heat protection material required to keep internal temperatures within acceptable limits. Basically then the planetary lander configuration lacks reliability.

Analysis both of the oriented and non-oriented prior-art generators or vehicles reveals that they are limited in their application. It is estimated that the specific power to be expected from these past intact re-entry generators is in the range of 0.9 to 1.4 watts per pound.

It is an object of this invention to overcome the deficiencies of the prior art and to provide a reliable space vehicle or generator capable of intact re-entry and having the facility of preventing damage to fuel enclosure or capsules such that a dangerous radioactive condition results from re-entry and impact.

SUMMARY OF THE INVENTION

This invention arises from the realization that the enclosure or shield weight may be minimized in a space vehicle, and an optimum specific power may be achieved in a space generator, by combining the benefits of non-orientation and low ballistic coefficient. An unoriented vehicle spins and tumbles at random during re-entry and a localized stagnation heating is avoided. With the low ballistic coefficient preserved until impact the creating of a dangerous condition by rupture or melting down of the capsule is eliminated.

In accordance with ths invention a re-entry vehicle or generator is provided which as an enclosure or casing from whose surface fins extend. The fins are not supported to any substantial extent from the enclosure but support each other so that they are not deformed or bent back during re-entry by heating of the enclosure to a softening temperature. The temperature of the enclosure may then be permitted to rise substantially and a substantial reduction may be effected in enclosure mass with resulting increase in specific power.

The configuration of the vehicle or generator is, in accordance with this invention, generally three-dimensionally symmetrical. The enclosure in accordance with this invention is generally spherical with the fins, a plurality of mutually orthogonal intersecting rings generally perpendicular to the surface of the sphere.

It has been found that the vehicle according to this invention has the following advantageous characteristics:

(1) In non-orienter re-entry the total surface area absorbs heat of re-entry.

(2) There is a large effective stagnation-point radius in all orientations.

(3) The ballistic coefficient is low and reliably controllable in all attitudes.

(4) The center of pressure and center of gravity are coincident in all attitudes.

(5) The fins transmit minimum aerodynamic load stresses to the surface of the enclosure. This allows the enclosure shell to absorb maximum heating since it does not need great strength.

(6) The symmetry of the configuration of the vehicle prevents damping.

(7) Fins or rings of lightweight reinforced pyrolitic graphite are readily attached to the enclosure. Because of the complete instability of the configuration, dead-air-region hot spots which would normally burn fins off at the roots in stable configurations, are only of a transient nature in the configuration according to this invention and do not create a structural problem.

(8) Because the configuration according to this invention has high drag, its impact velocities are low, in the 100–150 ft./sec. range or lower. The impacts are readily controllable and burial of the capsules may be prevented.

(9) The basic character of the configuration is flexible enough to be applicable to any vehicle or generator regardless of fuel form or power level.

Low terminal velocity and low ballistic coefficient is achieved by properly setting the dimensions of the rings or fins in a radial direction (sometimes designated in this application as $t$ and called "thickness." The ballistic coefficient, B, decreases sharply with increase in the dimension of the fins or rings radially of the shell or enclosure. Essentially as this radial dimension is increased the vehicle according to this invention descends more and more like a parachute. In a typical situation for a 310 watt generator according to this invention with fin radial dimension of 5 inches, it was found that the peak heating per square foot, per second is only 23 b.t.u. as compared to 200 b.t.u. for prior-art structures. The enclosure shell is composed of beryllium and the fins or rings are carbonized or composed of carbon; typically, reinforced pyrolitic graphite.

BRIEF DISCRIPTION OF THE DRAWINGS

For a better understanding of this invention, both as to its organization and as to its method of operation, together with additional objects and advantages thereof, reference is made to the following description, taken in connection with the accompanying drawings, in which.

DESCRIPTION OF EMBODIMENTS

Figure 1:
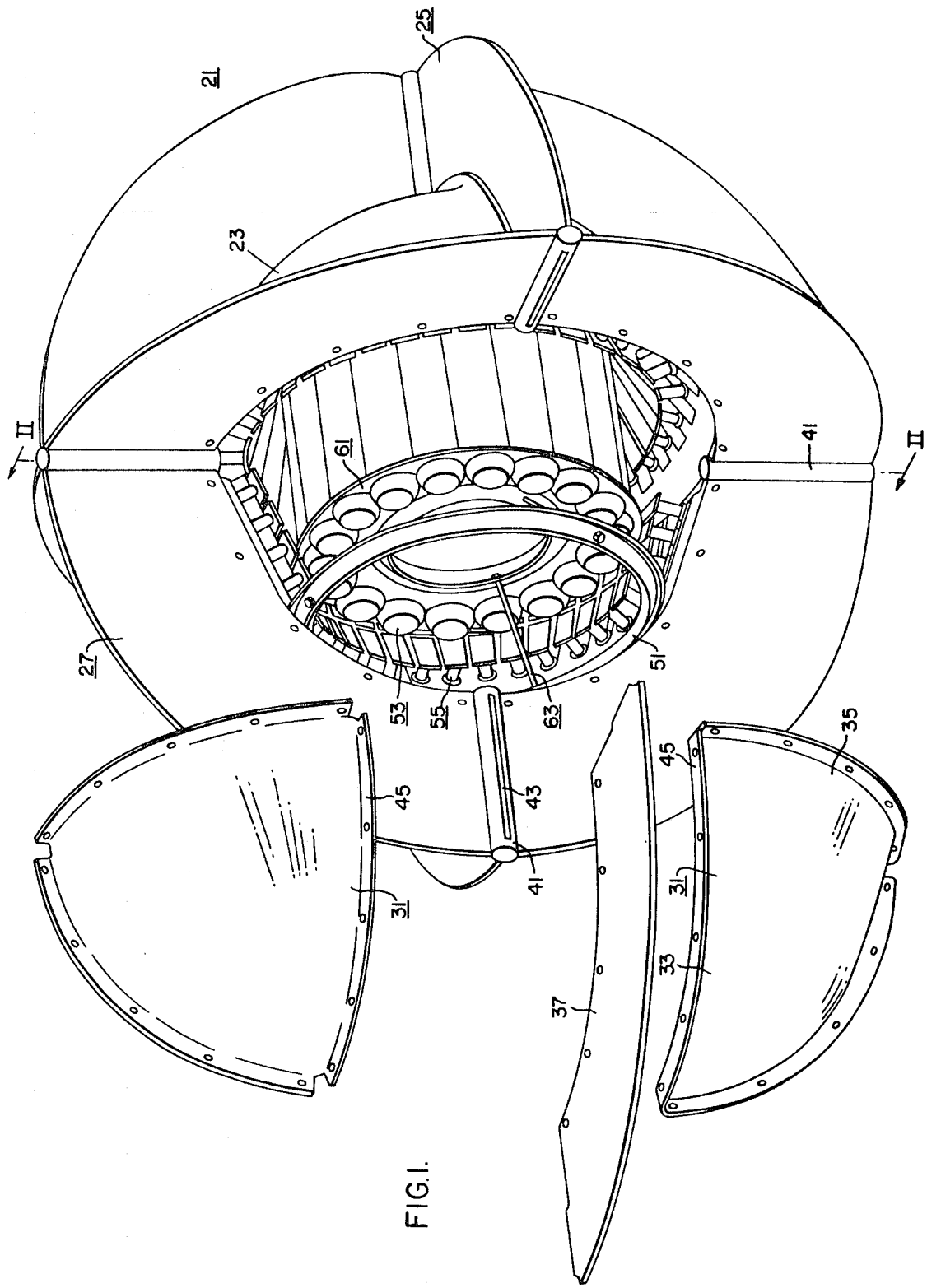
FIG. 1 is a view in perspective, partly exploded, to separate a fin or ring section, and adjacent shell sections, which shows an embodiment of this invention.
Figure 2:
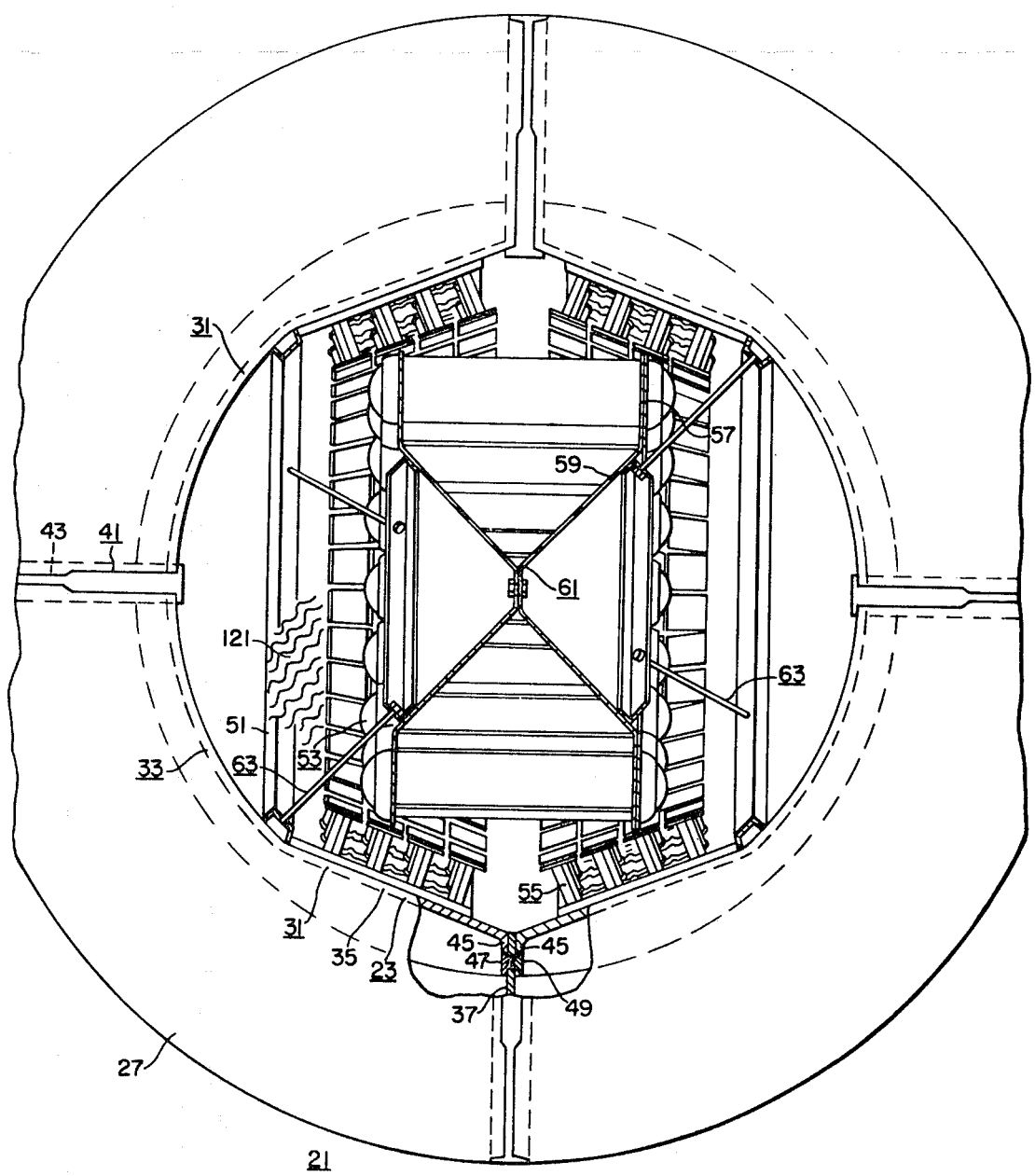
FIG. 2 is a view in section, along line II—II of FIG. 1 with part of the section broken away to show the joining of the fins and shell.

The apparatus shown in FIGS. 1 and 2 is a radio-isotope thermoelectric generator 21 having a generally spherical outer shell 23 and fins in the form of rings 25 and 27. The shell is formed of eight flanged dish-shaped segments 31, each having a generally spherical portion 33 from which a plane portion 35 extends (FIG. 2). The rings 25 and 27 are formed of arcuate strips 37 each subtending an angle of about 90°. The outer structure of the generator 21 also includes six sealing plugs or rods 41, two extending from diametrical poles of the shell and four around the great circle between the poles (equator). Each plug has four slots 43 into which the strip 37 converging at each pole penetrate, and in which they are engaged. The outer structure is formed by engaging the arcuate strips 37 in the slots 43. Then the segments 31 are mounted with their flanges 45 engaging opposite rims of the abutting strips 37 and the segments and strips 37 are bolted together by interlocking fasteners or bolts 47, 49 (FIG. 2).

Typically each shell segment 31 is composed of beryllium about ¼ inch thick. The rings 25 and 27 are typically composed of, or coated with, graphite and are also about ¼ inch thick. The slotted rods 41 are also typically composed of (or coated with) graphite. Typically for a 310 watt generator the shell 23 has a diameter of about 21 inches and the overall diameter of the outer structure is 34 inches; that is the radial dimensions of the fins or rings t is about 7½ inches.

Within the shell 23 there are opposite supporting rings 51 for the fuel capsules 53 and thermoelectric assembly 55. The capsules 51 are in an annular array and are held in capsule-retaining plates 57 (FIG. 2) which are secured to positioning plates 59 formed into a positioning body 61. Sections of each plate 59 are in the form of a truncated trapezoid. The smaller ends of the trapezoid abut and are secured to each other. The positioning body 61 is suspended from rings 51 by a spider of tensioned rods 63. The generator has appropriate terminals (not shown) for deriving power from the thermoelectric assembly 55. Typically power may be derived from a conductor passing through an insulating sleeve (not shown) in a longitudinal hole (not shown) in one of the plugs or rods 41.

Figure 3:
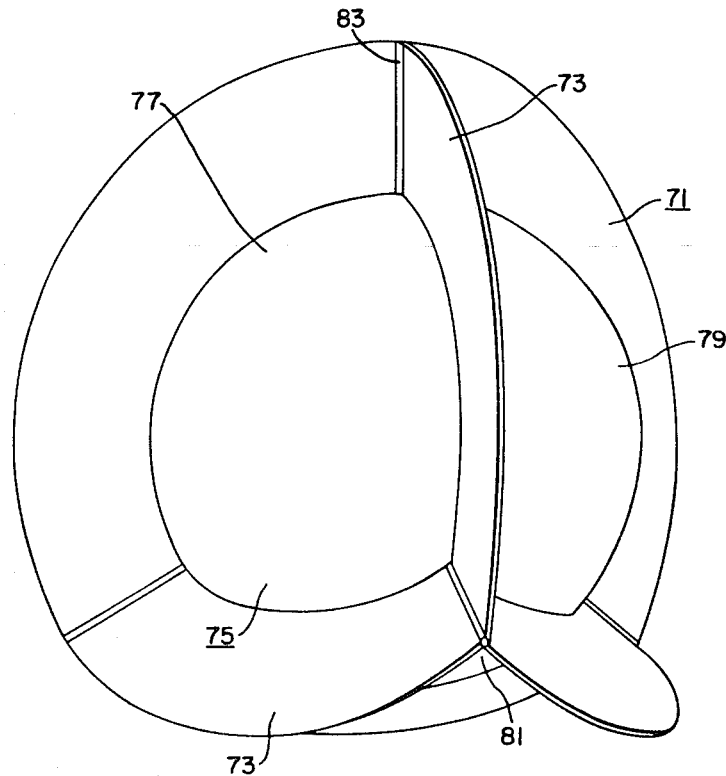
FIGS. 3 and 4 are views in perspective showing modifications of this invention.

In the modification shown in FIG. 3 the fins 71 are formed of arcuate strips 73 each subtending an angle of 120° and the shell 75 of four spherical segments 77, 79, 81 (one not shown) each defined by, and secured to, three of the strips 73. In this case three of the strips 73 converge at, and are engaged by, a rod 83 at one pole of the shell 75 and the other strips define three shell segments 77, 79 (one not shown) at this pole and one segment 81 opposite this pole.

Figure 4:
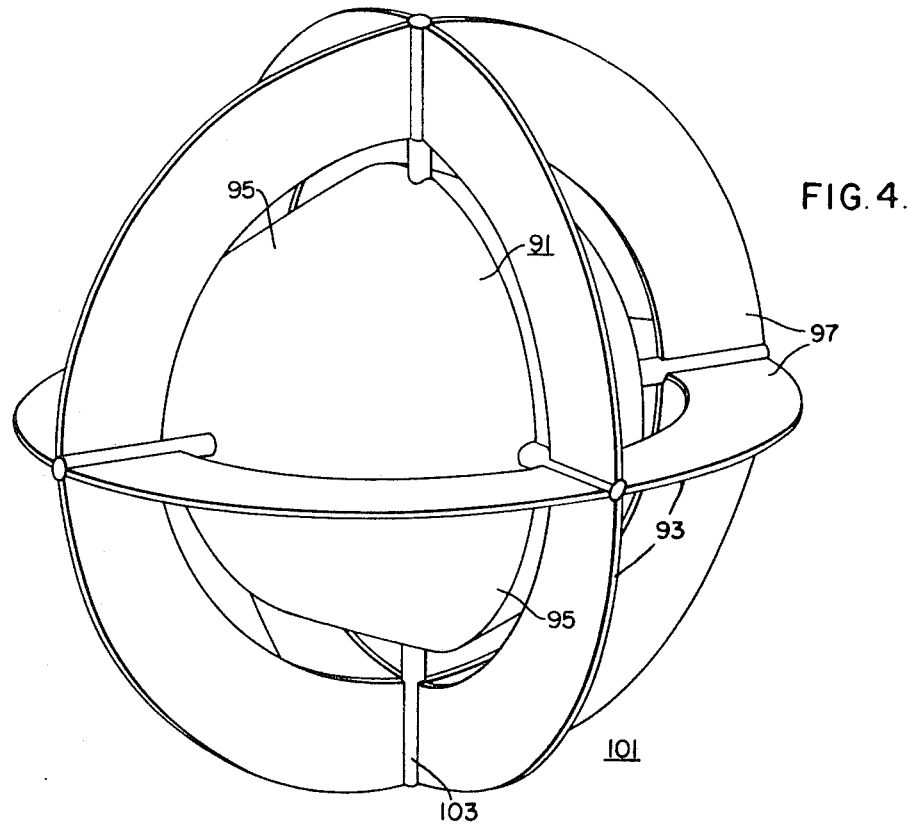

In the modification shown in FIG. 4 the shell or enclosure 91 is separated from the fins 93. The enclosure 91 is formed by bolting together segments 95 as in the embodiment shown in FIGS. 1 and 2 but the fin strips 97 are not interposed between the flanges (not shown) of the segments. The generator 101 shown in FIG. 4 includes six rods 103, like the generator of FIGS. 1 and 2, but the rods 103 are slotted near their inner heads to engage and secure the shell segments 95. The ring strips 97 engage and are secured to the rods 103.

The fins may also be formed into a grid having a generally spherical enclosure in which the shell floats.

It is desirable that the ballistic coefficient, B, shall be small and, to achieve low ballistic coefficient, it is desirable that the drag coefficient $C_D$ and the total projected area $A_P$ shall be high.

The total projected area, $A_P$, for a vehicle is the sum of the projected areas of the ring and generator including the shell. It is given by the equation:

$$A_P = \frac{\pi D^2}{4} + 2\pi \overline{R} t \quad (2)$$

$A_P$ is referred to A in the following discussion.

The drag coefficient for the embodiment shown in FIGS. 1 and 2 is given by:

$$C_{D1} = \frac{C_{Dg}\frac{D^2}{4} + 2C_{DR}\overline{R}t}{\frac{D^2}{4} + 2t\left(\frac{D}{2} + \frac{t}{2}\right)} \quad (3)$$

and for the modification shown in FIG. 4:

$$C_{D2} = \frac{C_{Dg}\frac{D^2}{4} + 2C_{DR}\overline{R}t}{\frac{D^2}{4} + 2t\left(\frac{D}{2} + \frac{3}{2}\right)t} \quad (4)$$

In Equations 2, 3, 4

$C_{D1}$ and $C_{D2}$ are the drag coefficients in the two cases;
$C_{Dg}$ is the drag coefficient for the generator 21 or 101 alone including its casing 23 or 91;
$C_{DR}$ is the drag coefficient for the rings 25, 27 or 97;
D is the diameter of the generator including the casing;
$t/R$ is, to a reasonable approximation, equal to $D/2+l$,
  $l$ being the distance from the shell to the mean circumference of the rings.

For FIGS. 1 and 2
$$l = t/2$$
For. FIG. 4

$l=$ is, to a reasonable approximation equal to $3/2t$.

$C_{D1}$ and $C_{D2}$ are within 5 or 10% of each other and the value of $C_{D2}$ may be used for computation. It is then assumed that $C_{D2}=C_D$. The drag coefficients, $C_{Dg}$ and and $C_{DR}$ for the generator and ring, estimated within reasonable accuracy are presented in the following Table A.

TABLE A

| Component | Mach number | $C_D$ |
|---|---|---|
| Sphere | Hypersonic 10 | .92 |
| Ring | | 1.71 |
| Sphere | Subsonic <1 | 0.5 |
| Ring | | 1.17 |

Figure 5:
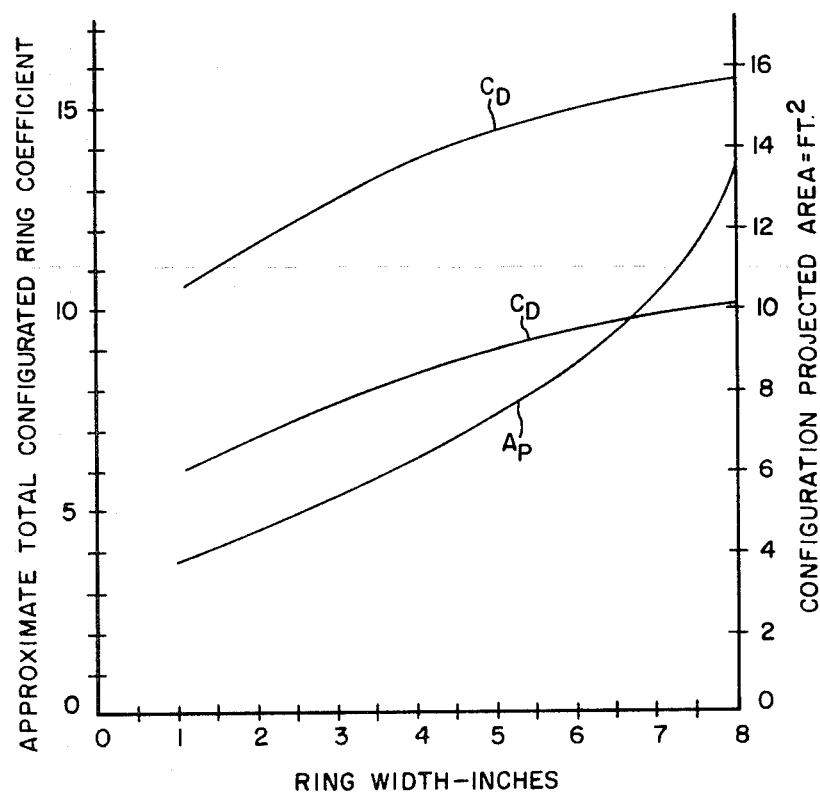
FIGS. 5 thru 16 are graphs showing the properties of a vehicle or generator according to this invention.

FIG. 5 presents graphs of the drag coefficients and total projected area as a function of the radial width of the rings assuming a generator capable of delivering 250 watts and having a diameter D of 2 ft.

Radial width in inches is plotted horizontally, drag coefficient is plotted vertically on the left and projected area in square feet on the right.

Figure 6:
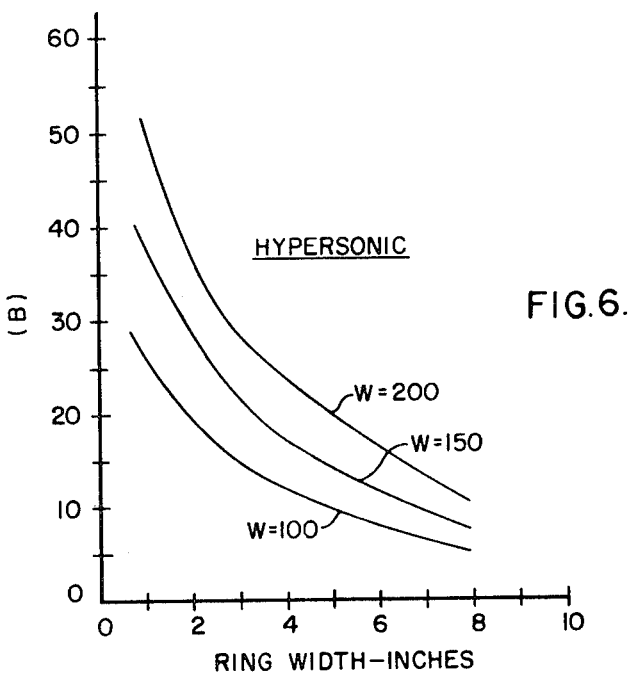
Figure 7:
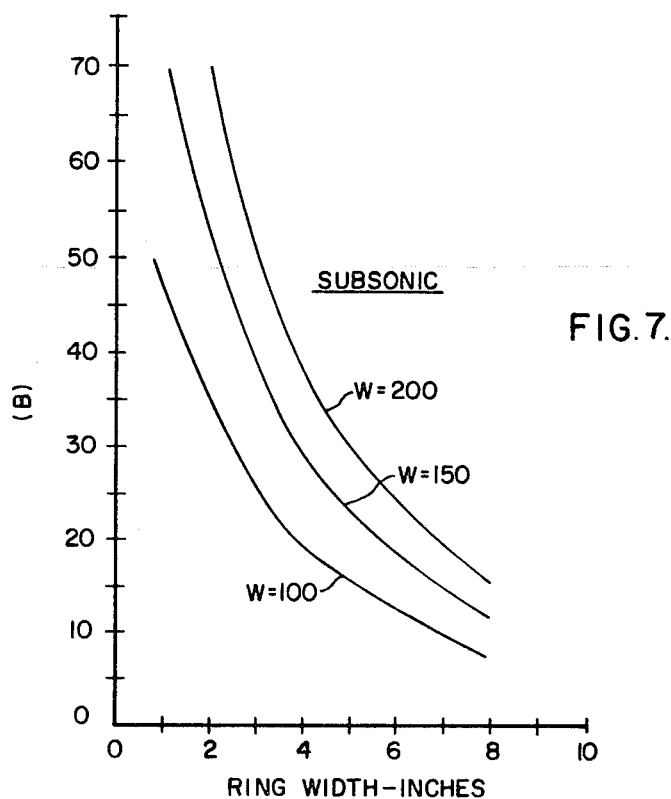

Based on FIG. 5 the ballistic coefficient $B = W/C_D A$ (Equation 1) is plotted in FIGS. 6 and 7 as a function of radial width of rings, for rings weighing 100 pounds, 150 pounds and 200 pounds respectively. It is seen that the ballistic coefficient decreases sharply as ring width increases.

The terminal velocity $V_T$ is given by:

$$V_T = 28.8\sqrt{B_{subsonic}} \qquad (5)$$

Figure 8:
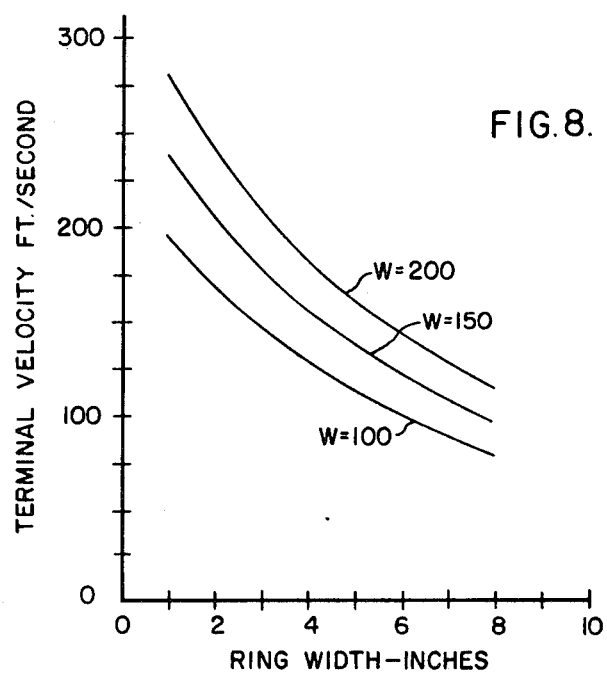

Based on FIG. 7 terminal velocity in feet per second is presented in FIG. 8 as a function of width of rings for 100, 150 and 200 pound vehicles. The terminal velocity for all vehicles is less than 200 ft. per second for rings having a width 4 inches and less than 130 ft. per second for a width of 7 inches.

Based on the foregoing analysis, the width of the ring decelerator may be optimized as a function of ballistic coefficient. What is desired is the lowest ballistic coefficient per unit weight of the three decelerator rings. Assuming reinforced pyrolytic graphite as the ring material (density $\simeq$ 50 lb./ft.$^3$) and rings whose thickness is approximately ¼ inch, the weight of the 3 rings is given as:

$$W_R = \frac{300\pi}{48}\left(t + \frac{3}{2}t^2\right) = 19.6\left(t + \frac{3}{2}t^2\right) \qquad (6)$$

for attached rings (FIGS. 1 and 2).

Figure 9:
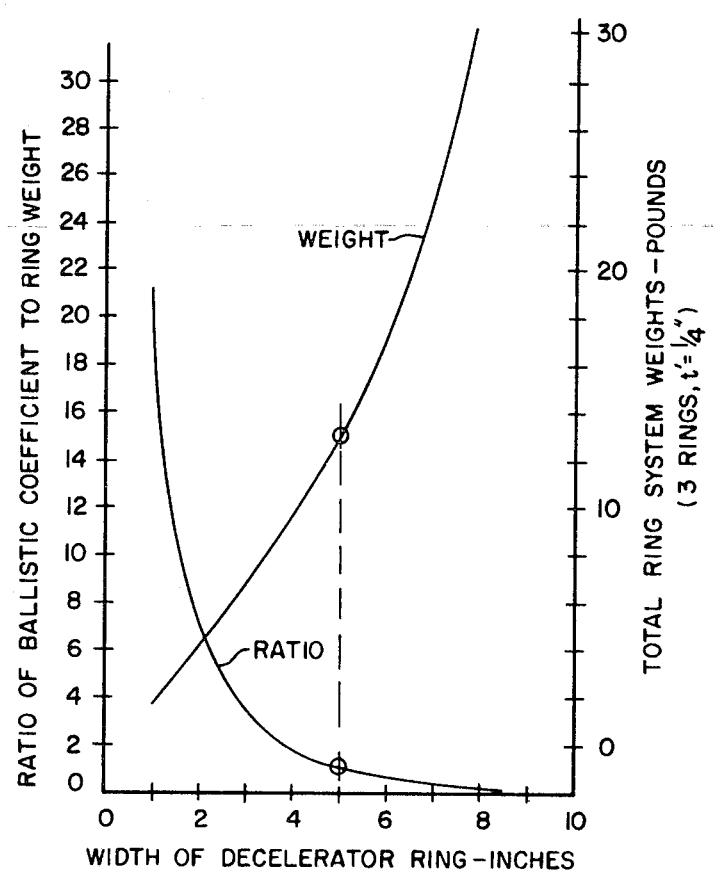

In FIG. 9 the ratio of ballistic coefficients, B, to weight of rings in pounds is plotted as a function of ring width in inches for ¼ inch thick rings of reinforced pyrolitic graphite. There is also a plot of total ring system weight (3 rings) in pounds as a function of ring width in inches. The ratio is plotted vertically on the left and the weight on the right.

The optimum point is at a ratio of about 1 where the rate of change of the ratio width width becomes zero (curve becomes linear). The total weight at this point is 15 pounds.

Based on the above analysis a typical re-entry may be considered for a 310 watt generator having the following characteristics:

W = 150 lb.
D = 2 ft.
$t$ = 5 in.
$W/C_{DA}$ = 13.5 hypersonic

Dynamic conditions at the inception of the re-entry were taken as:

$V_e$ = entry velocity
$h_e$ = entry altitude
$\phi_e$ = entry angle (angle to the line parallel to the tangent to the earth directly above the point of re-entry)

Figure 10:
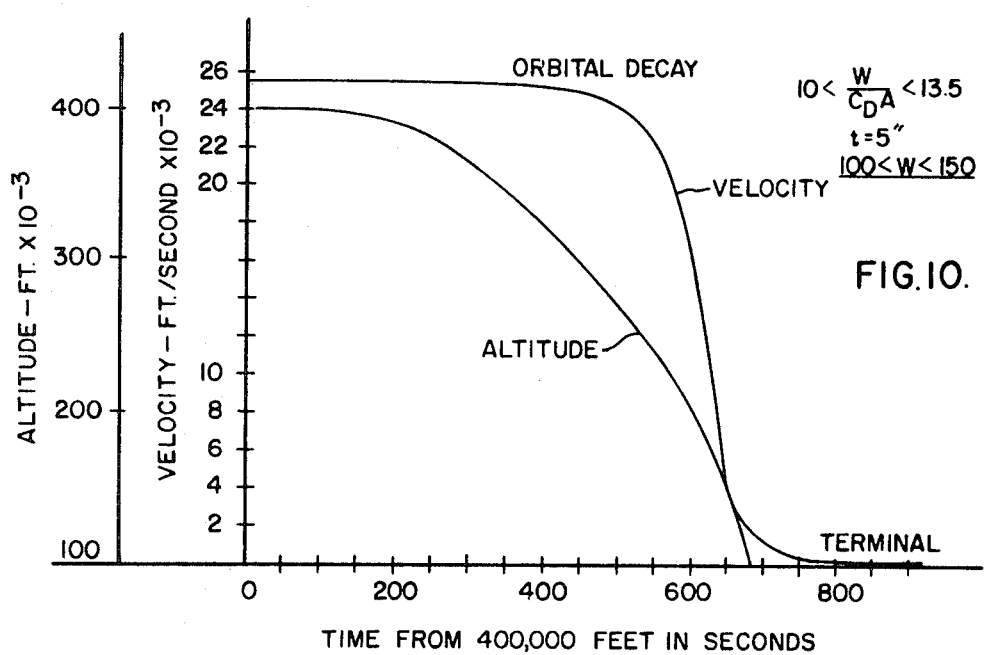

FIG. 10 shows the altitude and velocity curves as a function of time derived by solving the equations of motion for the assumed vehicle under the assumed conditions. Time in seconds is plotted horizontally and altitude in ft.$\times 10^{-3}$ and velocity in ft. per second $\times 10^{-3}$ are plotted vertically. The curves are plotted only down to the altitude 100,000 ft. where no significant aerodynamic heating remains.

It is desirable to evaluate the mechanical instability (tendency to tumble) of the ring configuration vehicle according to this invention. It may be assumed that the vehicle has angular velocities $w_x$, $w_y$, $w_z$ about its three perpendicular axes and a translational velocity V. Because of the symmetry of the configuration, only moments around axes normal to the flight axis cause damping of any initial spin and tumble of the generator. Furthermore, because of the position of the rings and their symmetry, the integrated effect in time of the flight velocity on the damping of the RTG around those axes normal to the flight axis is nil. The only non-symmetrical aerodynamic load tending to damp rotation is then that due to rotational, not translation drag.

An analysis on the basis of the above assumptions gives the damping moment, M, for a vehicle having a radius for 22 inches including the rings as:

$$M = 21.9\rho w^2 \qquad (7)$$

where:

$\rho$ is the density of the medium of descent (air) at the point of observation
$w$ is the angular velocity at this point In this case essentially a structure as in FIG. 4, with the rings 5 inches wide and spaced from the shell 5 inches, was assumed. This assumption is the most unfavorable for achieving the characteristic sought; namely an assurance of tumbling during re-entry. The solution of the differential equation of motion for rotational damping gives $$\frac{w_0}{w_i} = \left\{1 + \frac{705}{I_{RTG}}\rho_0 w_i \int_0^t e^{-\beta h} dt\right\}^{-1} \qquad (8)$$

where:

$w_i$ is the initial velocity
$w_0$ is the final velocity
$I_{RTG}$ is the inertia of the vehicle
$\rho_0$ is the density of air at sea level
$\beta$ is the constant of variation of air density with height
$h$ is the height The density of air varies exponentially with height.

In determining the inertia $I_{RTG}$ in the above Equation 8 the masses and disposition of the capsules 53 and the thermoelectric elements 55 and the heat shield 121 (FIG. 2) must be considered.

The inertias about the two axes X and Y perpendicular to the flight path for a generator having a shell of radius 1 ft. and rings having width of 5 inches are based on the data shown in the following Table B.

TABLE B

| | Component | Assumed weight, lb. | $I_X$, lb.-ft.$^2$ | $I_Y$, lb.-ft.$^2$ |
|---|---|---|---|---|
| 1 | Heat shield | 25 | 24.5 | 16.95 |
| 2 | Thermoelectric elements | 15 | 11.65 | 8.64 |
| 3 | Capsules | 112.5 | 54.8 | 48.5 |
| 4 | Ring | 5 | 6.50 | 6.50 |
| 5 | do | 5 | 13.0 | 6.50 |
| 6 | do | 5 | 6.50 | 13.0 |
| | Total | 167.5 | 116.95 | 100.09 |

The magnitudes $w_0/w_i$ about the axes X and Y for $w_i = 1$ revolution per minute and 100 revolutions per minute are presented in the following Table C.

TABLE C

| $w_i$ | $(w_0/w_i)$ X | $(w_0/w_i)$ Y |
|---|---|---|
| 1 r.p.m. | 1/1.00057 | 1/1.00066 |
| 100 r.p.m. | .946 | .938 |

It is then concluded that once the ring generator according to this invention begins to tumble and spin by reason of the component of rotational momentum induced in it upon separation from a spacecraft during re-entry, or by encountering the non-homogenous portions of the upper atmosphere upon entry as a free body, it will continue to spin and tumble.

The spherical shell 23 of the generator 21 according to this invention acts as both a radiator for the thermoelectric cold shoe and as a shield against re-entry heating. The basic equation which describes the average re-entry heat flux to a random spinning and tumbling sphere is:

$$\bar{q} = .275 \frac{17600}{(\sqrt{R})}\left(\frac{\rho}{\rho_0}\right)^{1/2}\left(\frac{V}{V_E}\right)3.15 \qquad (9)$$

In Equation 9

$\rho$ and V are the air density and velocity at the point of observation $\rho_0$ is the air density at sea level
$V_E$ is the re-entry velocity
R is the radius of the vehicle.
 (1ft.)

This equation is conservative in its heat flux estimates in that it assumes a cold wall condition on the body; i.e., re-radiation of heat is neglected.

Figure 11:
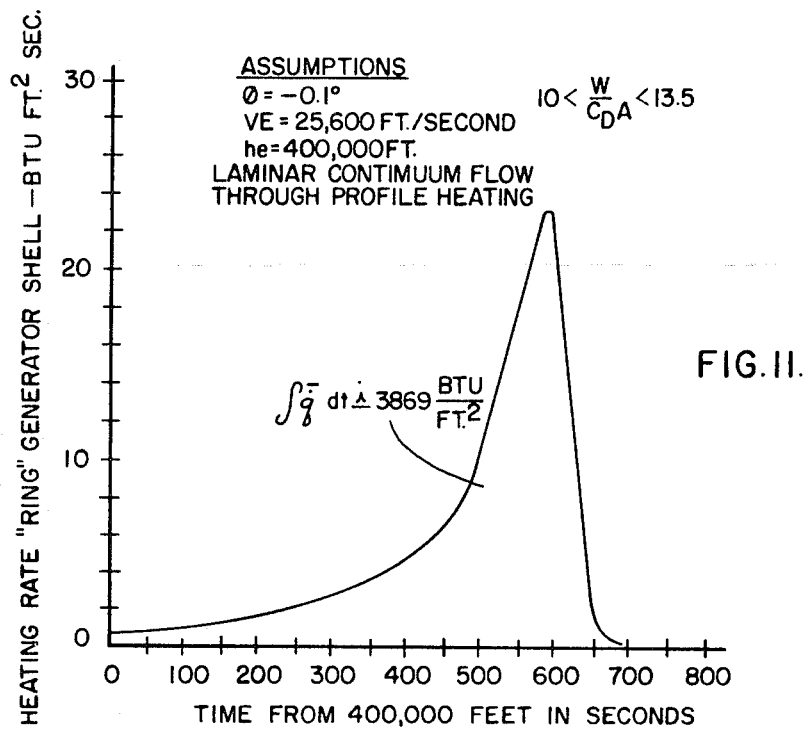

FIG. 11 shows this average re-entry heat flux on the radiator shell as a function of time during the re-entry of the typical generator described above and under the conditions (assumption) shown in FIG. 11. The peak average heat flux is no more than 23 B.t.u. per square foot of vehicle per second and the total integrated cold wall heating is only 3869 B.t.u./ft.$^2$. This corresponds to an average maximum radiation equilibrium temperature on the shell of approximately 2200° F. The peak temperature computation is based on an assumed emissivity of 0.9 resulting from the coatings on the radiator surface used in normal practice, for only 10 seconds. Normal re-radiation and heat storage capacity of the entire generator mass should appreciably lower this peak temperature even further for all practical design considerations such as stress analysis.

The average heat transfer to a stable disc is approximately .613 that to a sphere of equal diameter. Modifying this factor with the area ratio between a solid disc and a ring as assumed.

$$\bar{q}/\bar{q}_S = .613 \left(\frac{\text{Area of ring}}{\text{Area of disc}}\right) \quad (10)$$

where $\bar{q}_s$ is the heat flux to a sphere
Modifying the results by incorporating in Equation 10 the differences in effective radii of the sphere and the ring $$\bar{q} \text{ Ring} = \frac{.613}{1.350} \times \frac{4.25}{10.55} = .183 \bar{q}_S \quad (11)$$

The maximum stagnation point heating during re-entry experienced on the stable sphere is approximately 85 B.t.u. ft.$^2$/sec. This is an un-averaged value.

Therefore, the maximum ring heat flux is:

$(\bar{q}_R)$ max. = .183(85) = 15.4 B.t.u./ft.$^2$/sec.

Assuming an emissivity of $\epsilon = .90$ for the ring materials and re-radiation from front and back surfaces, the maximum ring re-radiation temperature is 1540° F. If random spinning and tumbling is assumed, this temperature drops to 1220° F.

These values are conservative since the effect of the conical flow field induced by the central sphere on the rings would tend to reduce the aerodynamic heating. This occurs because of the lower flow field velocity within the sphere shock envelope in relation to the true potential flow outside the envelope. In addition, the interference drag should be considerable and tend to further reduce the ballistic coefficient. This effect was not estimated in this analysis.

Figure 12:
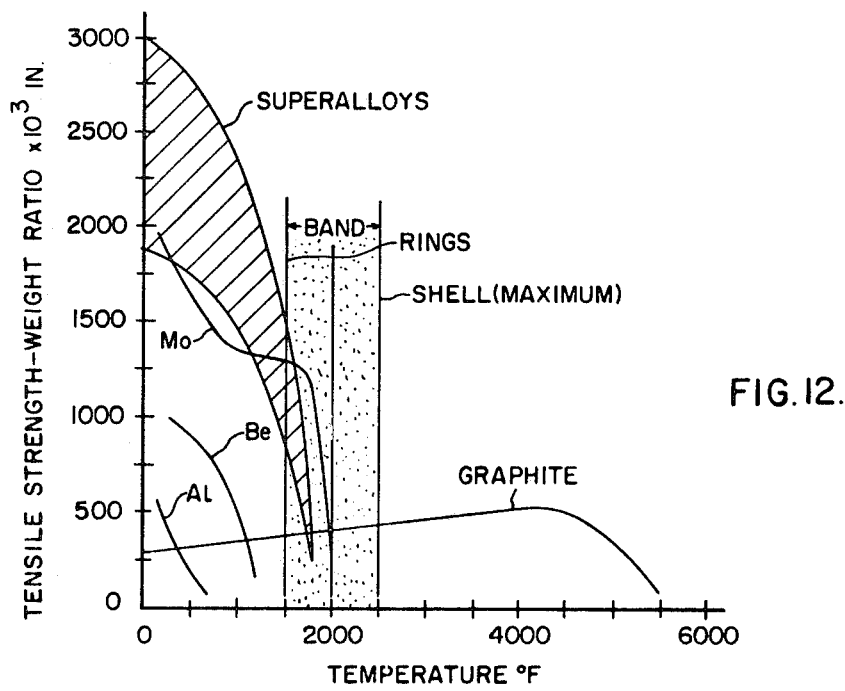

Once the approximate maximum temperature profile of the generator components has been established during the re-entry material may be selected. FIG. 12 shows the strength-to-weight ratio as a function of temperature of materials available. The stippled area shows the range of temperature of operation of a vehicle according to this invention during re-entry.

Figure 13:
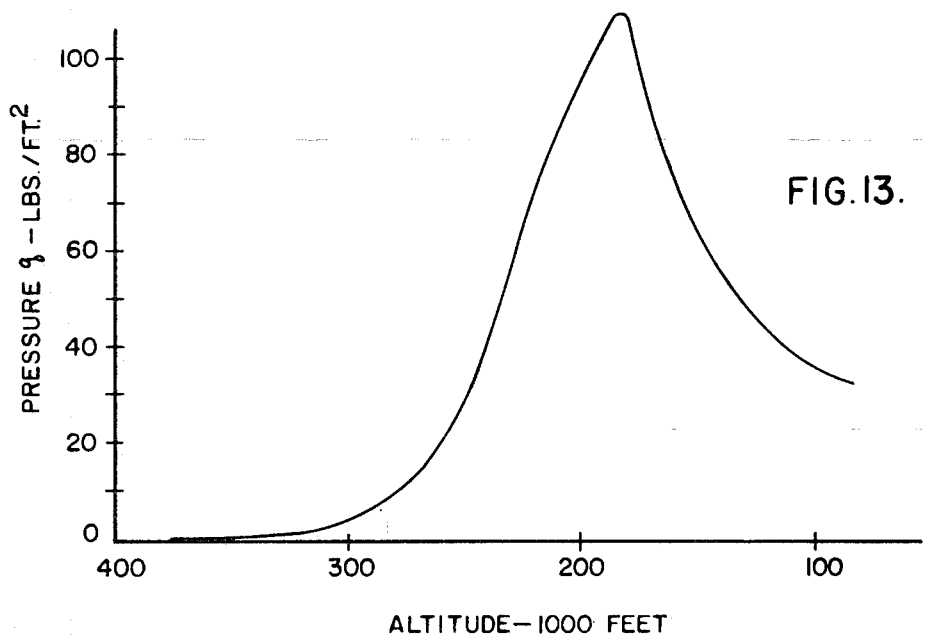

To make intelligent judgments on, and selection of, the materials, the air loads on the components must be evaluated. FIG. 13 shows the dynamic pressure profile during re-entry. From this data it can be computed that the maximum air loads on the rings occur at approximately 180,000 ft. and are about 800 lbs. in magnitude.

During re-entry, the generator shell is subjected to the aerodynamic heat flux shown in FIG. 11. If radiation and conduction to the interior of the generator are neglected, then the only heat loss is through re-radiation from the outer surface. If it is assumed that the Be shell is so thin that no temperature gradient exists in the shell, then the differential equation governing the temperature of the shell is:

$$MC_P \frac{dT}{dt} = [\bar{q} - \sigma \epsilon T^4] A_S \quad (12)$$

where:

M is the mass of the shell
$C_P$ is the specific heat of Be
$\bar{q}$ is the aerodynamic heat input
$\rho$ is the Stefan-Boltzman constant
$\epsilon$ is the emissivity
$A_s$ is the surface of the shell The heat flux given in FIG. 11 is representative of that which would be experienced by a tumbling 1 ft. radius sphere, but to apply this to the ring configuration according to this invention it is necessary to modify this flux to take the effective radius of the total generator into account.

In addition, the heat flux is directly proportioned to the square root of the ballistic coefficient which varies, so that this correction must be applied also. The heat flux then, for any ballistic coefficient given by:

$$\bar{q} = (\bar{q}/\sqrt{(\bar{q}_R)}) \sqrt{\frac{W/C_D A}{13.5}} \quad (13)$$

where 13.5 is the maximum ballistic coefficient assumed in FIG. 11, and where $\bar{q}_c$ is given by FIG. 11.

For the purposes of this analysis, the ballistic coefficient was varied from 7.5 to 13.5 and an average radius of 1.5 feet was used, so that $$\bar{q} = .817 \bar{q}_C \sqrt{\frac{W/C_D A}{13.5}} \quad (14)$$

Figure 14:
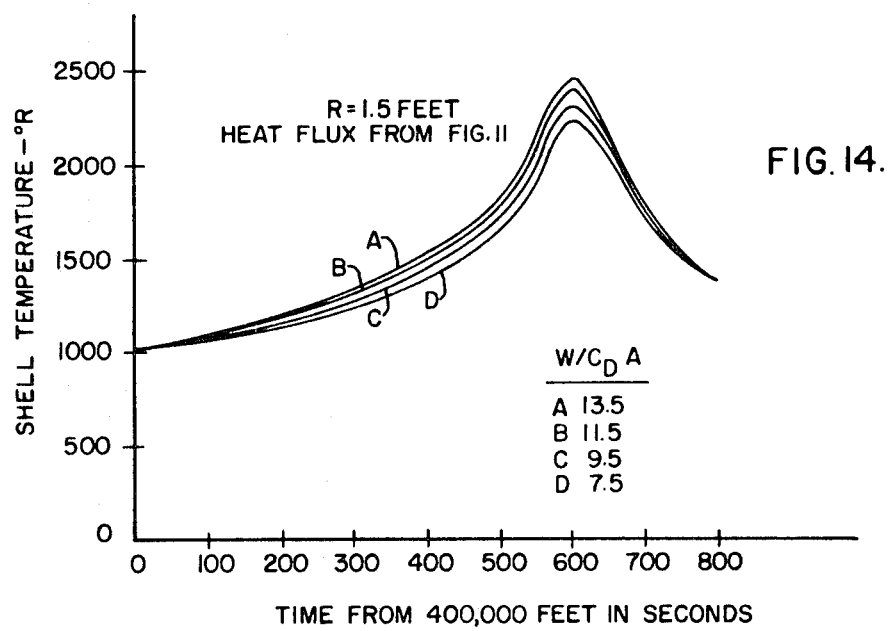

FIG. 14 shows a temperature-time history, derived by computer treatment of Equations 13 and 14, of a vehicle according to this invention having an effective radius of 1.5 ft. re-entering from an altitude of 400,000 ft. In FIG. 14 time of descent is plotted horizontally and temperature in absolute Fahrenheit degrees (° R) is potted vertically for four indicated ballistic coefficients.

Figure 15:
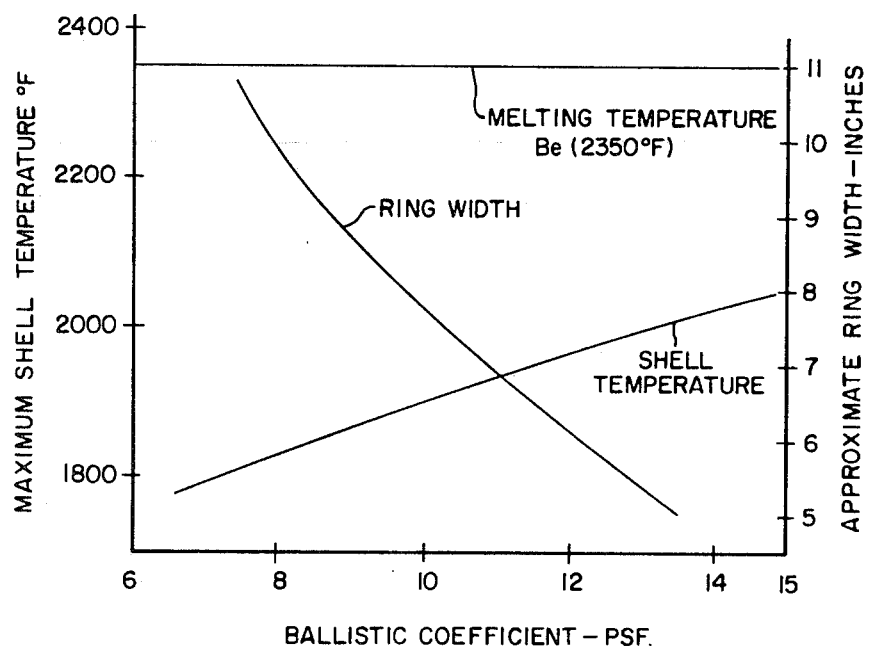

In FIG. 15 ring width and shell temperature are correlated as a function of ballistic coefficient.

Figure 16:
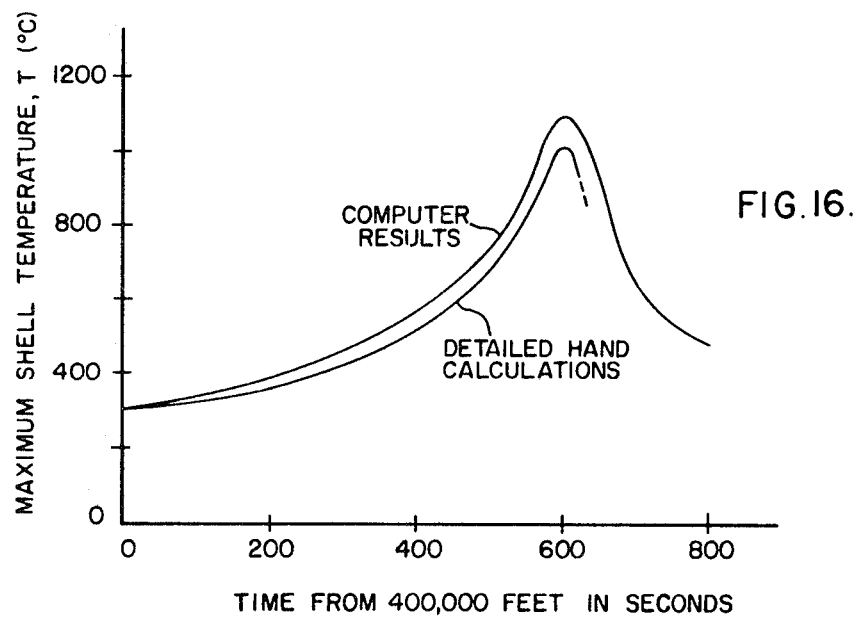

FIG. 16 is a temperature-time history in which the temperature is presented in ° C. The upper curve corresponds to the upper curve of FIG. 14 and the lower curve was derived from detailed calculations independently of Equations 13 and 14. The correspondence of the curves is striking.

While preferred embodiments of this invention have been disclosed herein many modifications thereof are feasible. This invention is not to be restricted except insofar as is necessitated by the spirit of the prior art.

What is claimed is:

1. A re-entry vehicle, which when re-entering the earth's atmosphere is capable of surviving re-entry intact, the said vehicle having an enclosure having a plurality of fins extending from the surface thereof, and means, extending externally from the body of said enclosure, interconnecting said fins in mutual mechanical supporting relationship with each other, said interconnecting means having substantially the same resistance to deteriorating on re-entry as said fins, so that stress exerted on any fin is predominantly taken up, not by the enclosure but, by the other fins supporting the stressed fin through said interconnecting means.

2. The vehicle of claim 1 wherein the enclosure is composed of beryllium and the fins are composed of carbon.

3. A generator of electrical energy particularly for use in space, which when re-entering the earth's atmosphere is capable of surviving re-entry intact, the said generator having a primary source of energy and means, connected to said source, for converting said energy into electrical energy, the said generator being characterized by an enclosure for said source and coverting means, said enclosure having a plurality of fins extending from the surface thereof, and means extending externally from the body of said enclosure interconnecting said fins in mutual mechanical supporting relationship with each other, said interconnecting means having substantially the same resistance to deterioration on re-entry as said fins, so that stress on any of said fins is predominately taken up, not by the enclosure but, by the other fins supporting the stressed fin through said interconnecting means.

4. The generator of claim 3 wherein the source is a radioactive isotope and the converter is thermoelectric means.

5. A re-entry vehicle, which when re-entering the earth's atmosphere is capable of surviving re-entry intact, the said vehicle having an enclosure having a plurality of fins extending from the surface thereof, said enclosure and fins being geometrically symmetrical in all three dimensions, and means, extending externally from said enclosure, interconnecting said fins in mutual mechanical supporting relationship with each other, said interconnecting means having substantially the same resistance to deteriorating on re-entry as said fins, so that stress exerted on any fin is predominately taken up by the other fins supporting the stressed fin through said interconnecting means.

6. A re-entry vehicle, which when re-entering the earth's atmosphere is capable of surviving re-entry intact, the said vehicle having an enclosure having fins extending from the surface thereof, said fins supporting each other so that stress exerted on any fin is predominately taken up by the other fins supporting the stressed fins, said enclosure being of generally spherical form and said fins being in the form of rings, the planes of said rings intersecting said enclosure in great circles.

7. The vehicle of claim 6 wherein the rings are perpendicular to the surface of the sphere and are mutually orthogonal.

8. The vehicle of claim 6 wherein the rings extend from, and are in part supported by the surface of the sphere.

9. The vehicle of claim 6 wherein the rings are predominately separated from the surface of said sphere.

10. A generator of electrical energy particularly for use in space, which, when re-entering the earth's atmosphere, is capable of surviving re-entry intact, the said generator having a primary source of energy and means, connected to said source, for converting said energy of said source into electrical energy, the said generator having an enclosure for said source and said converting means, said enclosure having fins extending from the surface thereof, said fins mutually supporting each other so that stress on any of said fins is predominately taken up by other fins supporting the stressed fins, the said enclosure being of generally spherical configuration and being provided at opposite poles thereof with supporting rings and said source comprising an assembly of radioactive capsules arrayed in a cylindrical configuration and suspended from said supporting rings by rods secured to said rings and to said assembly, the said converter being mounted between the internal wall of said enclosure and said assembly.

References Cited
UNITED STATES PATENTS

| | | | |
|---|---|---|---|
| 2,459,357 | 1/1949 | Bell | 102—2 |
| 2,584,826 | 2/1952 | Wyckoff | 102—3 |
| 3,378,449 | 4/1968 | Roberts et al. | 244—1X |
| 3,416,750 | 12/1968 | Young | 244—1 |
| 3,421,714 | 1/1969 | Koerner | 244—1 |

MILTON BUCHLER, Primary Examiner

J. L. FORMAN, Assistant Examiner

U.S. Cl. X.R.
102—205; 244—3.23